July 5, 1938.                A. D. OWEN                 2,123,079
                              FLUID SEAL
                           Filed Dec. 14, 1937

INVENTOR.
A. Durham Owen

Patented July 5, 1938

2,123,079

UNITED STATES PATENT OFFICE 2,123,079

FLUID SEAL

Allison Donham Owen, Berkeley, Calif., assignor to National Oil Seal Co., Oakland, Calif., a corporation of Nevada Application December 14, 1937, Serial No. 179,736

2 Claims. (Cl. 288—1)

This invention relates to fluid seals and particularly to a seal adapted to fit within a very narrow annular space between a housing opening and a shaft projecting therethrough.

It is an object of the present invention to provide a unitary fluid sealing structure which may be assembled without complicated jigs and with a minimum of operations; to provide a cage structure which permits pre-forming of the annular clamping groove walls, thereby eliminating subsequent operations on these parts after the sealing member is in place; to provide a device which can be produced very economically; and to produce a two-piece cage of novel shape, said shape lending itself to great economies.

In the accompanying drawing forming part of this specification and in which like reference numerals are employed to designate like parts throughout the same;

An important feature of the invention is the provision of a unitary fluid sealing unit adapted for press fit insertion in a housing or on a shaft, and in which the assembly operations on the seal itself have been reduced to a minimum by means of the novel arrangement of the parts, and the pre-forming of the walls of the axial clamping groove within which the sealing member is engaged.

The seal is retained in a non-rotative position in the housing bore by what is commonly known as a press fit. The outside diameter of the cage on an "internal" seal is made several thousandths oversize to provide a drive fit with the bore. An "external" seal has the inside cage diameter made several thousandths undersize to provide a drive fit when inserting it on the shaft. This drive fit of the cage supports and maintains the leather 11 or other suitable sealing means in sealing position around the shaft so as to confine or dam up whatever lubricant or fluid content may be in the housing and prevents this lubricant from escaping along the shaft or at the outer periphery of the seal.

Use of the word leather herein is not intended to be limitative, but descriptive of any flexible material, natural or synthetic, having the properties of resiliency, flexibility, non-abrasiveness, non-porosity or substantially so, etc.

Figure 1:
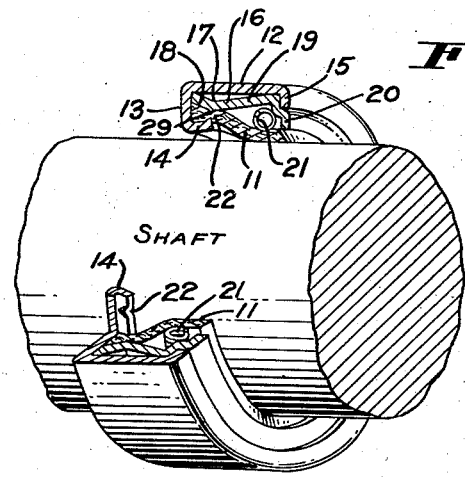
Fig. 1 is a view in perspective of one form of the invention with a transverse section cut out and a portion of the center cage extending beyond the cut.

The fluid seal as shown in Fig. 1 is of the internal form and includes an outer metal stamping substantially circular in shape having a cylindrical axially extending peripheral flange 12 forming the outer peripheral wall and a spaced shorter axial flange 14 connected by a radially extending portion 13. When assembled, the outer radial portion 15 on flange 12 is spun in to hold the parts together. Radial wall 13 is very short inasmuch as this seal is specially designed to fit installations where the annular space to be sealed is very narrow.

One of the objects of this invention is to eliminate the difficulties which arise from so-called one-piece constructions where the flange 14, for instance, is spun or bent in during assembly to clamp the sealing member 11 against the peripheral flange 12. With this latter type of construction the movement of flange 14 inwardly to where it will clamp sealing member 11 must be done in complicated and expensive dies and at considerable cost in labor and time.

Figure 3:
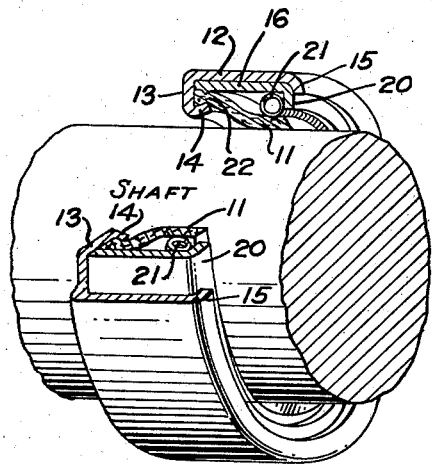
Fig. 3 is a view similar to Fig. 1 of a modified form of the invention.

To obviate this difficulty the present construction employs an inner cage member 19 having an axially extending portion 16 which preferably is substantially co-extensive with peripheral wall 12 and lies beneath it. In the drawing the thickness of all parts has been exaggerated for purposes of illustration, as has also been exaggerated the downward bowing of portion 16 at 17 to form the inclined clamping surface 18. Axial flange 14 and portion 16 form between them an axially extending clamping groove adapted to secure sealing member 11 in the cage with a non-rotative, leak-tight fit.

Where the annular space between shaft and housing is at an absolute minimum, portion 16 may be made flat as shown in Fig. 3. The inner cage member 19 lends itself to easy manufacture and may be formed of a punching having case closure wall 20 integral.

The flexible sealing member 11, is of the "channel" or "barrel" type; that is, it is essentially tubular in form and lacks any radial flange portion heretofore so generally employed in fluid seals. One end is securely clamped in the aforementioned clamping groove which holds it out of contact with the shaft and the other end is held in contact with the shaft by spring 21.

It is preferred that axial flange 14 and surface 18 should be inclined toward each other so as to form a narrow mouth at 22. When the sealing member 11 is clamped between 14 and 18, the effect is that of a dovetail joint. In Fig. 3 the effect is similar although only axial flange 14 is inclined to the axial plane.

A particular advantage gained from this novel construction lies in the manner of assembly. This is most easily accomplished by placing the outer cage member with its radial wall 13 flat on a jig. Sealing member 11 is then placed with its inner periphery adjacent axial flange 14. Inner cage 19 is then inserted in the outer cage member and pushed downwardly. Axial portion 16 is preferably made with a snug or forced fit with peripheral wall 12 so that when it comes to rest in clamping position against sealing member 11 there will be no tendency for it to leak or loosen its hold on the sealing member. It is also preferred that on portion 16 at 29, or on the inner periphery of axial flange 14 at 22, or on both there be provided irregularities or upset portions which will have the effect of locking the sealing member 11 not only against rotation, but also against any axial displacement.

As inner cage 19 is forced to the bottom until its lower edge abuts radial wall 13 of the outer case, the effect is one of tightening and securely locking sealing member 11 in the annular axially extending groove formed by flange 14 and wall 18. This locking I have found to be so effective and secure that further inward bending of axial flange 14 by means of spinning or other dies is unnecessary, and a very considerable economy in manufacture is achieved by means of the construction described.

Figure 2:
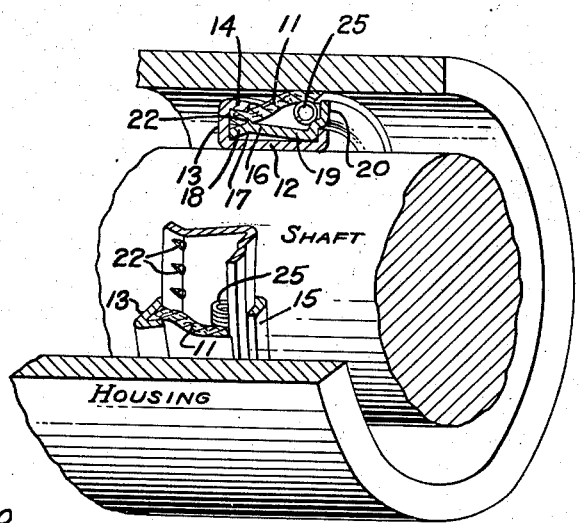
Fig. 2 is a similar view of what is known as an external seal with a portion of the inner cage extending beyond the cut.

In Fig. 2 is shown a construction having parts substantially identical with Fig. 1 except that the axial clamping flange for the sealing member is formed on the outside instead of on the inside and spring 25 is of the expanding type instead of the contracting type like spring 21. This external type of seal is sometimes used on the drive shaft of automobiles in the clutch assembly.

The construction shown in Fig. 3 is substantially like Fig. 1 except that inner member 19 has its axial portion 16 formed flat.

The assembly and functioning of the construction shown in Fig. 3 is substantially identical with the structure already described inasmuch as reliance for a secure locking of the sealing member in the annular groove is placed on the pre-forming of flange 14 and the clamping effected between it and the inner face of portion 16.

It will of course be obvious that the construction shown in Fig. 3 lends itself to use in so-called external seals as readily as does the one shown in Fig. 2.

While the invention is shown herein in preferred embodiment, it is to be understood that further modifications are possible without departing from the spirit or the scope of the invention.

What I claim is:

1. A unitary fluid sealing device adapted to seal between two relatively moving substantially concentric cylindrical surfaces comprising an axially extending flexible sealing member arranged with one end in sliding leak-proof fit with one of said cylindrical surfaces and the other end spaced away therefrom slightly; an outer cylindrical ring with one end unflanged and the other end flanged, said flange being bent back on the ring's inner periphery to form an annular axially extending groove which before assembly of the seal has an opening only wide enough that the spaced end of the sealing member will barely slide in; an inner cylindrical ring flanged on one end only nested in said outer ring and with its unflanged end extending into the axial groove so that when the seal is assembled said groove is narrowed by the thickness of the material in said end ring, the latter then forming one axial complementary face of the clamping groove.

2. A unitary fluid sealing device adapted to seal between two relatively moving substantially concentric cylindrical surfaces comprising, an axially extending flexible sealing member arranged for a sliding leak-proof fit with one of said cylindrical surfaces; a cylindrical member having one periphery arranged for a non-rotative fluid tight fit with the other of said cylindrical surfaces, and having one edge of said periphery formed into radial and axial flange portions; and a cylindrical member flanged on one end only, nested in said cage with its unflanged end extending into the cage substantially the full depth to form one axial complementary face of an axial clamping groove and upon insertion to effect the secure anchoring of said sealing member therein.

A. DONHAM OWEN.